March 14, 1967 R. E. ROBARGE 3,308,955
APPARATUS FOR INJECTING INTO WATER SOFTENING SYSTEMS
Filed Feb. 4, 1964 2 Sheets-Sheet 1
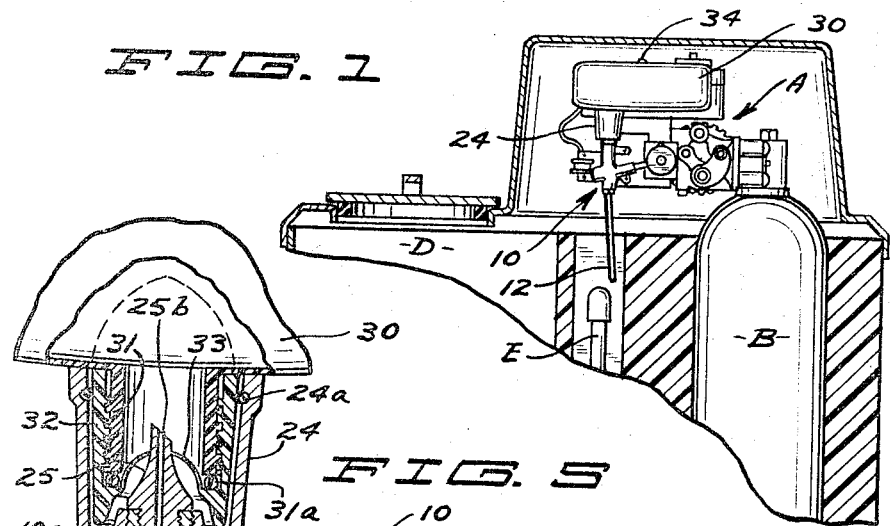
FIG. 1
FIG. 3
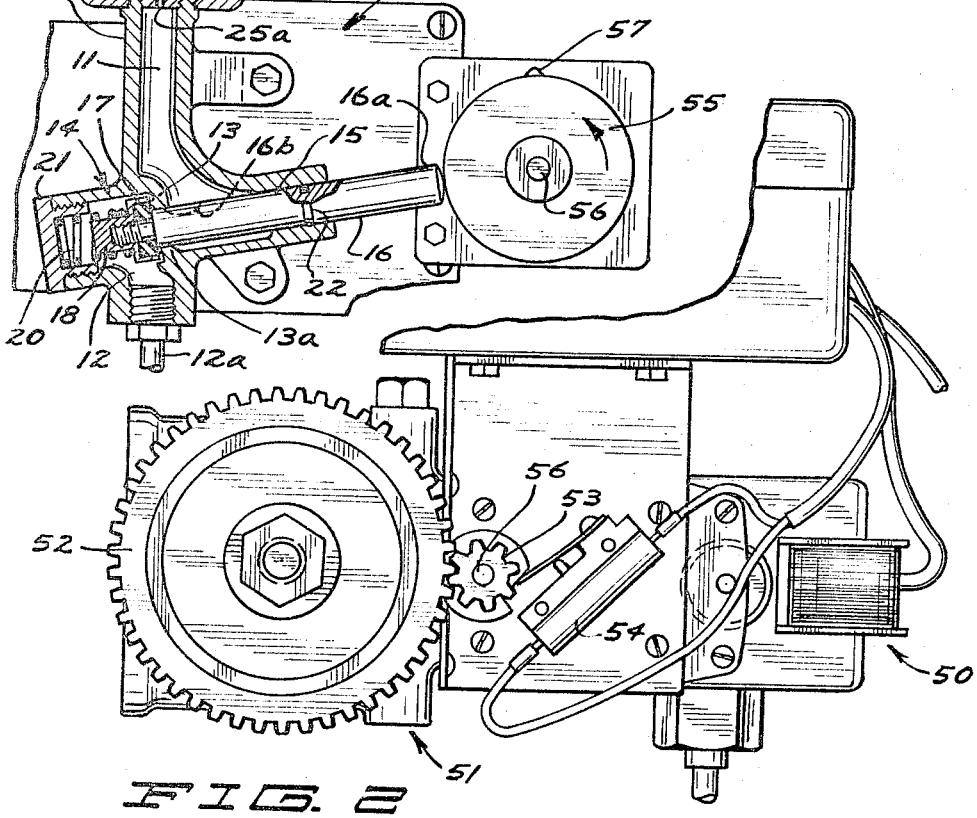
FIG. 2
INVENTOR.
ROBERT E. ROBARGE
BY
John W. Adams
ATTORNEY

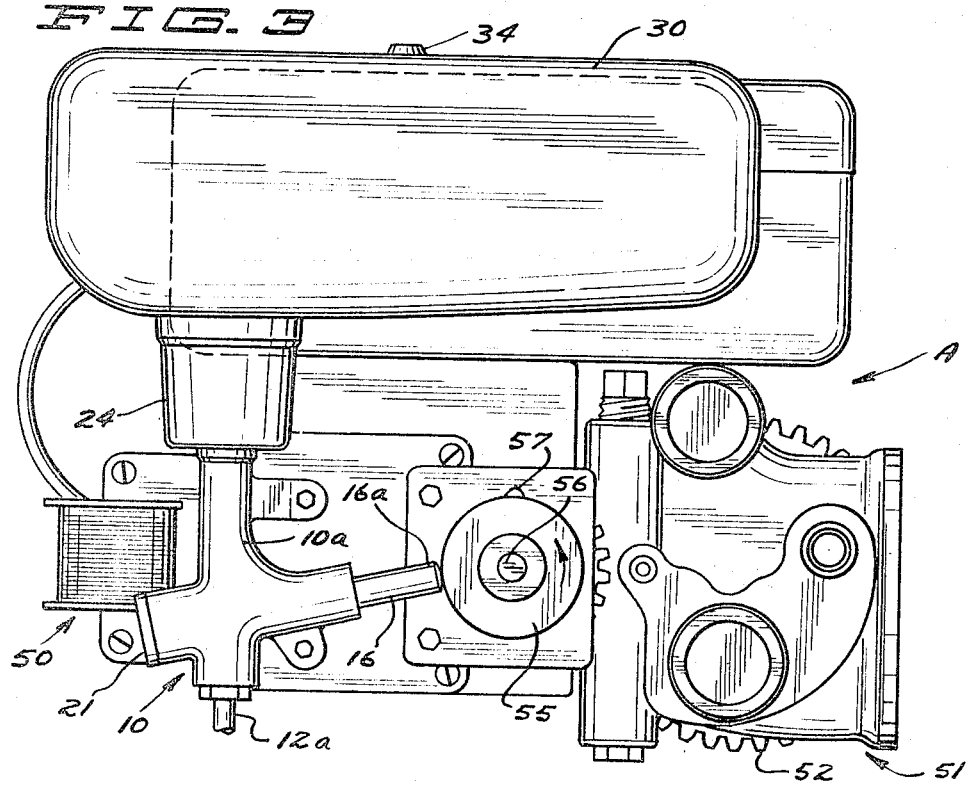
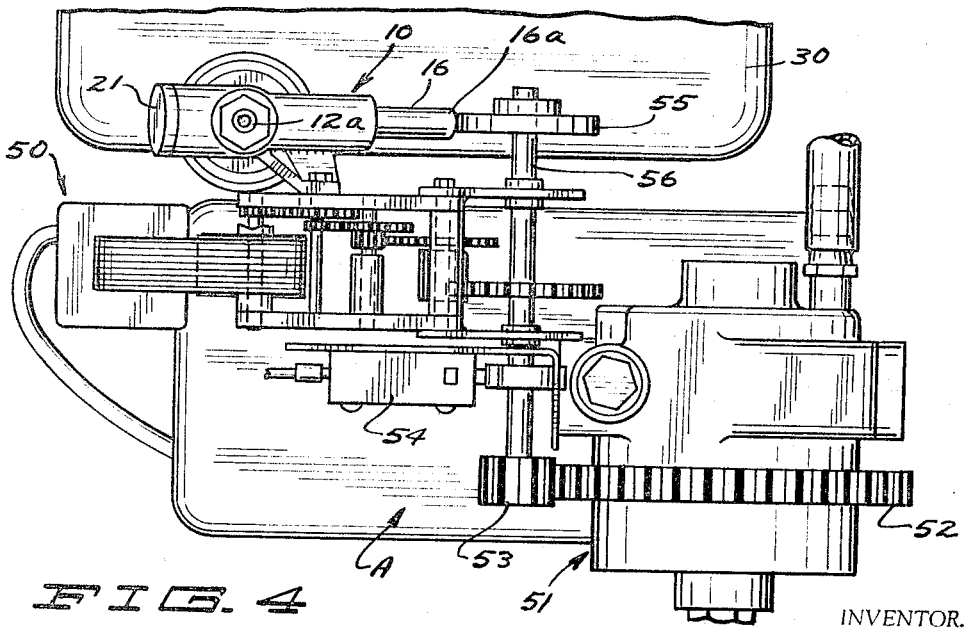

United States Patent Office 3,308,955
Patented Mar. 14, 1967

3,308,955
APPARATUS FOR INJECTING INTO WATER
SOFTENING SYSTEMS
Robert E. Robarge, Minneapolis, Minn., assignor to The
Meadowbrook Company, Edina, Minn., a corporation
of Minnesota
Filed Feb. 4, 1964, Ser. No. 342,480
5 Claims. (Cl. 210—139)

This invention relates generally to a method and apparatus for periodically introducing preselected amounts of an iron dissolving solution into a water softener.

In using available water softening equipment the problem of corrosion due to iron concentration in the raw water delivered to the softener presents a difficult problem. To solve this problem applicant has provided a metering valve unit which is operable in combination with a time controlled water softener system such that a predetermined amount of an iron dissolving ingredient may be injected therein and will thus eliminate the iron by holding the iron in fluid suspension for removal thereof during the automatic cycling of the softener. The method provided by applicant includes injecting the iron dissolver into the water softener system at predetermined intervals which are controlled by the time controlling apparatus of the water softener.

Automatic softeners as is well known operate on a time control system which will provide a service cycle, a backwash cycle and a regeneration cycle such that the softener is periodically cleaned of brine and subsequently recharged with a fresh brine solution. The most opportune time to add the iron dissolving ingredient is during this cycling process.

In order to accomplish proper metering of the iron dissolving ingredient to a water softening system, applicant has provided a unique fluid supply and fluid delivery control member actuated in response to the respective water softener cycles which will positively control the amount of delivery of the solution.

The softener system with which applicant's metering unit will operate most efficiently includes one which is provided with a timing clock to provide rotary motion to a valve opening cam at predetermined intervals and wherein the metering and control valve is provided with a positive closure mechanism to seal the valve and insure proper cutoff of the solution delivery.

The fluid supply system provided by applicant includes a supply tank containing a sufficient supply of the iron dissolving solution to last for a predetermined period and includes a membrane sealed tank cover which is receivable into the valve and wherein the valve is supplied with a membrane penetrating protrusion which will immediately allow communication between the tank and the valve when the tank is properly received and positioned on the valve, thus making the installation of a new supply tank a relatively simple operation.

It is therefore an object of applicant's invention to provide a metering valve in combination with a water softening mechanism to periodically inject a supply of iron dissolving solution into the softener unit.

It is a further object of applicant's invention to provide a metering valve unit communicating with a supply for periodically delivering a predetermined quantity of solution to the softener in response to the service, backwash and regeneration cycles of the softener.

It is a specific object of applicant's invention to provide a metering valve for a water softener system having a supply tank receiving and sealing unit thereon and provided with a supply tank penetrating member for penetrating and releasing fluid from the supply tank when the tank is positioned thereon.

It is a further specific object of applicant's invention to provide a method for introducing a predetermined amount of an iron dissolving fluid into the brine supply to dissolve into solution and to be subsequently delivered therefrom into a mineral softening bed of a water softener during the regenerating process for dissolving solid impurities delivered thereto by the raw water introduced into the softener.

These and other objects and advantages of this invention will more fully appear from the following description made in connection with the accompanying drawing, wherein like reference characters refer to the same or similar parts throughout the several views, and in which:

FIG. 1 is a partial vertical section through a water softening unit showing the metering valve in proper delivery position;

FIG. 2 is a partial elevation showing the drive mechanism for the valve actuating cam;

FIG. 3 is a vertical elevation showing a portion of FIG. 1 drawn to an enlarged scale particularly illustrating the valve mechanism;

FIG. 4 is a plan view taken of FIG. 3;

FIG. 5 is a vertical section taken substantially through the metering valve assembly.

In accordance with the accompanying drawings the metering valve 10 is mounted in controlled relation upon a water softening timer controlled mechanism generally designated A. As shown in FIG. 1 the softening unit consists of the softening tank B which as known is provided with a mineral bed, a brine well D and a brine valve well E. Generally the operation of a timed softening system is well known and consists of a sequence in which raw water is delivered to the softener unit B and after treatment, passes therefrom to service conduits. After a period of time the softening material in the softening unit B requires cleaning and the adulterated brine in the softening unit B is washed out of the unit by having water pass upwardly through the softening material and drained therefrom. During this cycle only hard untreated water is fed to the service lines. After a predetermined backwash, fresh brine is drawn from the brine well D through the brine valve E into the softener B and into the mineral bed where the brine is deposited. For present purposes it should be sufficient to say that the metering valve 10 provided by applicant is controlled in response to each of these cycles and will periodically introduce a predetermined amount of iron dissolving solution into the brine system.

Metering valve 10 as best shown in FIG. 5 includes a housing 10a defining a longitudinally disposed inlet passage 11 arranged for communication with an outlet passage 12 and outlet conduit 12a extending therefrom and is provided with a control orfice 13 in regulating relation between the inlet 11 and discharge passage 12. The orifice 13 is provided with an extending circumferential flange 13a to serve as a valve seal for sealing against a movable valve unit designated 14.

In the form shown the valve unit 14 is provided with an extending operating shaft slidably mounted in an arcuate guideway 15 and orifice 13 such that one end 16a extends outwardly from the valve body 10a to provide a control and actuating end for the valve 14. The other end of the stem 16 is provided with a flexible sealing member 17 retained by a positive capturing cap 18 threadedly arranged on the end of shaft 16 to maintain the seal 17 in face to face relation with the arcuate valve seat 13a. Sealing pressure is provided between the flexible seal 17 and seat 13a by providing resilient compression spring member 20 in engaging relation with retaining cap 18 and a removable closure cap 21 threadedly received into the valve body 10a.

As shown in FIG. 5 a flow groove 16b is formed in the periphery of shaft 16 and extends longitudinally therealong. Groove 16b is normally adjacent orifice 13 and is of such a length to have the ends thereof communicating respectively with inlet 11 and discharge 12 when the valve unit 14 is unseated. In this manner the flow is actually through groove 16b.

A sealing member such as O-ring 22 is provided on the periphery of stem 16 to seal against the guide opening 15 and thus maintain the valve seal 17 in proper relation to seat 13a.

Discharge conduit 12 is arranged to extend downwardly as shown in FIG. 1 into the brine well E for delivery of the solution directly into the brine system.

An upstanding arcuate flange 24 is arranged in communicating relation with the inlet port 11 and is provided with a sealing member such as an O-ring 24a on the uppermost end thereof for sealing against a positioned fluid supply tank 30. A penetrating nozzle 25 is provided centrally of the tank holder 24 and is provided with a passage 25a through to allow communication with the inlet passage 11 of the valve 10. The extending boss 25 is substantially conical in shape and is provided with a beveled top 25b to provide a penetrating tip such that when a fluid tank 30 is positioned in the tank holder 24, proper positioning will force the beveled end 25b through a membrane sealing portion of the tank 30.

Tank 30, provided to hold a substantial amount of fluid and as shown in FIG. 5 is provided with a unique closure unit for sealing and interfitting with the valve 10. The closure unit includes a normal cap receiving boss 31 with screw threads on the outer periphery thereof for engagement with the internal threads of a closure cap 32. Boss 31 and cap 32 are of such a diameter to be received into the tank holder 24 and seal against O-rings 24a, thus holding the tank 30 securely therein. The closure cap 32 is provided with a sealing membrane 33 which ordinarily seals the tank 30 but is of such a thickness as to be easily penetrated by the beveled portion 25b of valve inlet 25 when in position within the tank holder 24. The closure cap 32 is further sealed to boss 31 by providing an O-ring to be in surrounding relation to membrane 33 and to thus abut with the ends of the extending boss 31. The tank 30 is also provided with an air inlet 34 on the top surface thereof which is also normally sealed but which after installation is cut off to allow communication to atmosphere.

The operation of the valve 10 is controlled by the electric driving motor 50 driving the softener valve 51 which all form a part of the control system A. In the form shown in FIGS. 2 and 4 the valve 51 is rotated to positions of service, backwash and regeneration through a gear 52 and drive pinion 53 arrangement. The pinion 53 rotates once for each of the sequences which are service to backwash, backwash to regeneration and regeneration to service. Thus for a full cycle the valve 10 will be opened and closed three times. The time at which the pinion 53 is actuated is controlled by a simple clock motor and after one revolution the micro switch 54 cuts the drive power to the pinion 53 until a predetermined time for each cycle has passed and the pinion 53 is again driven for another revolution. Drive cam 55 is mounted on and driven from driving shaft 56 which also drives pinion 53.

In the form shown a cam actuating projection 57 is provided on the periphery of cam 55 to actuate the valve mechanism 14 by urging the valve stem 16 longitudinally to separate the valve seal 17 from the seat 13a. After passage of the projection 57 the spring means 20 will urge the valve into closed position.

The valve 10 and tank 30 system is provided with an iron dissolving and rust inhibiting solution which is delivered by the valve at approximately ⅛ of an ounce per timed opening. Applicant has found this quantity sufficient to prevent the settling of the iron in the softening unit and to hold the iron in solution such that it may be derived from the unit.

In operation of this valve mechanism the valve housing 10a is mounted on the control portion A and the proper cam is installed on the drive shaft 56 for pinion 53. It is only necessary at this time to force a filled supply tank 30 into the tank receiver 24 penetrating the membrane 33. When the tank 30 is open to atmosphere by cutting off projection 34 fluid will flow into the inlet passage 11 so as to be in metering position. The operation continues only upon the actuation of the water softening cycles.

It is obvious from a discussion of the apparatus which also discusses the cooperation of the valve with the softener system that applicant has provided a new method for introducing an impurity dissolving fluid and more particularly an iron dissolving fluid directly into a softening system which will effectively eliminate herebefore used self contained introduction systems. To restate, the method as used with the apparatus provided by applicant consists of delivering for injection a predetermined amount of solution for each of the three cycles of a water softener. However, it should be understood that this injection could be made at only one of the water softener changes but of course the amount delivered would have to be increased proportionately.

It is obvious that applicant has provided a new and unique design for metering valve and a new use for a metering valve which is the introduction of an iron dissolving solution into a water softening unit. The fluid supply tank arrangement provided by applicant is also unique in that it is not necessary to open and pour from a container but rather it is only necessary to position a sealed container upon the valve and to open the same by forcing the tank downwardly to be penetrated by a portion of the valve.

It will, of course, be understood that various changes may be made in the form, details, arrangements and proportion of parts without departing from the scope of my invention, which generally stated consists in the matter set forth in the appended claims.

What I claim is:

1. In combination with a water softener having a brine supply system and a softening tank with control means for automatically regenerating the brine concentration in the softener tank, a metering valve for injecting predetermined amounts of an impurity dissolving solution into the brine system comprising:
    (a) a housing member defining an inlet passage and a discharge passage with orifice means affording communication between said passages;
    (b) a valve member arranged for sealing said orifice including:
        (1) a resilient for closing said orifice; and
        (2) a valve guiding and operating stem arranged for longitudinal sliding movement within the orifice and having an operating end extending outwardly from said housing and provided with a flow groove in adjacent position to said orifice and extending longitudinally along the stem such that when the sealing member is displaced the flow groove ends will be positioned respectively in the inlet passage and the discharge passage to afford communication therebetween;
    (c) means associated with said softener control means for automatically actuating the operative end of said valve guide to allow a predetermined amount of fluid to flow through said metering valve; and
    (d) fluid supply means communicating with said inlet.

2. The structure set forth in claim 1 and resilient closure means associated with said valve member for positively closing the same.

3. The structure set forth in claim 1 wherein said control means for said water softener unit is automatically cycled at predetermined timed intervals and said means for actuating said metering valve are operated thereby to provide a metered amount of fluid for each cycle.

4. The structure set forth in claim 1 wherein said fluid supply means comprises a fluid supply tank and an inlet nozzle member arranged in communicating relation to said inlet passage and fluid supply tank receiving and positioning means arranged in adjacent relation to said nozzle for receiving said fluid supply tank therein and positioning the same with respect to said nozzle.

5. The structure set forth in claim 4 wherein said nozzle is provided with a piercing portion on the extending-most end thereof and said fluid supply tank is provided with a penetratable seal member arranged to be in penetrating position when said tank is received into said tank receiving means.

References Cited by the Examiner

UNITED STATES PATENTS

| | | | |
|---|---|---|---|
| 2,755,246 | 7/1956 | Whitlock et al. | 210—191 |
| 3,003,638 | 10/1961 | Kryzer et al. | 210—139 |
| 3,078,224 | 2/1963 | Schultze et al. | 210—30 |
| 3,139,401 | 6/1964 | Hach | 210—30 |
| 3,164,550 | 1/1965 | Lamkin | 210—89 |
| 3,169,110 | 2/1965 | Rudelick | 210—191 |

MORRIS O. WOLK, *Primary Examiner.*

E. G. WHITBY, *Assistant Examiner.*